W. WRIGHT.
COMPUTING MACHINE.
APPLICATION FILED JULY 25, 1912. RENEWED JULY 7, 1916.
1,216,759.
Patented Feb. 20, 1917.
2 SHEETS—SHEET 1.
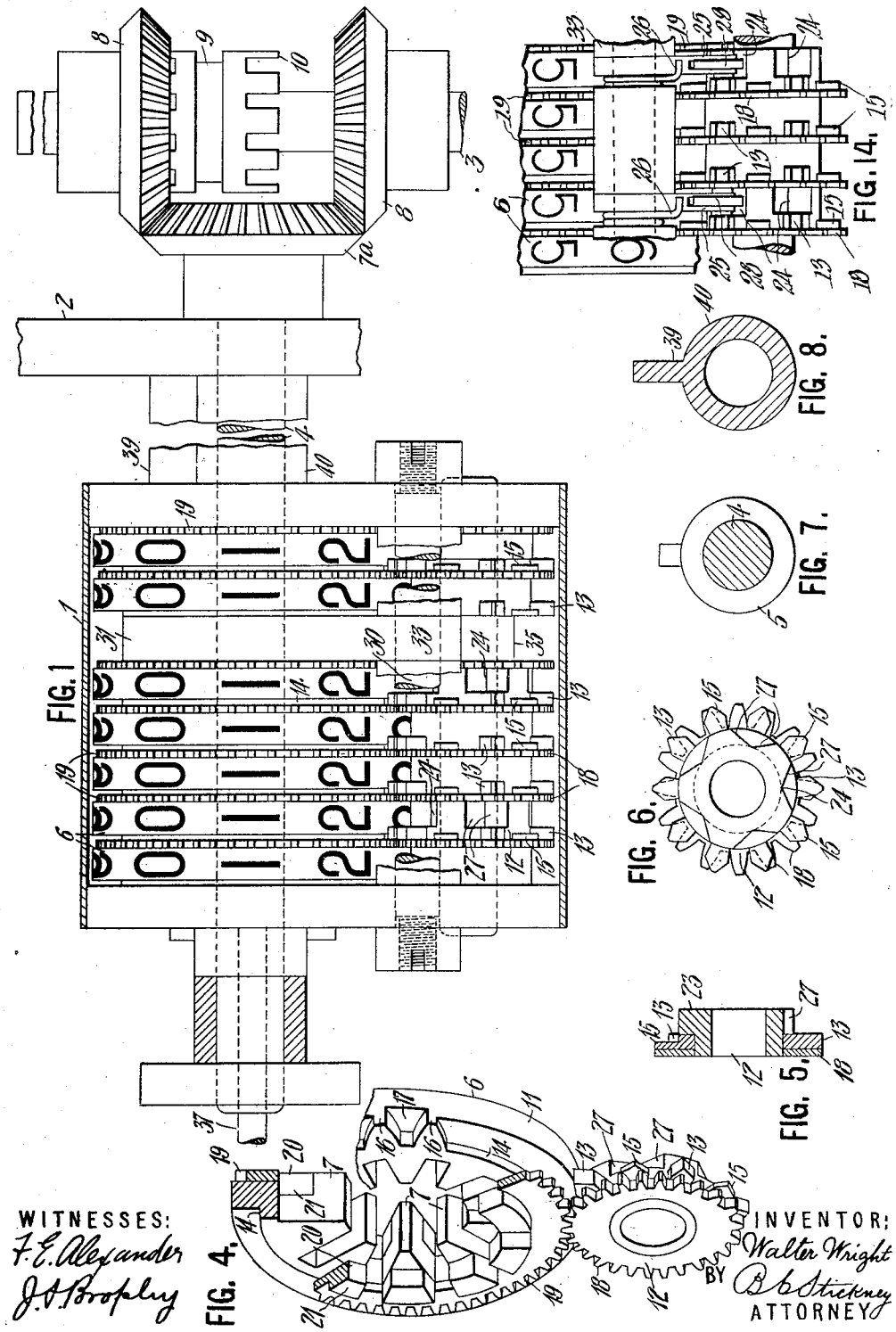

W. WRIGHT.
COMPUTING MACHINE.
APPLICATION FILED JULY 25, 1912. RENEWED JULY 7, 1916.
1,216,759.
Patented Feb. 20, 1917.
2 SHEETS—SHEET 2.
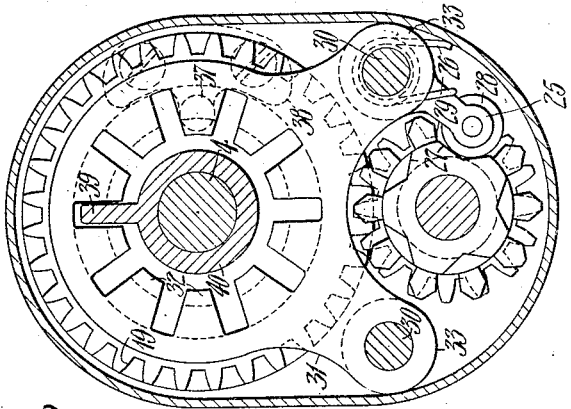
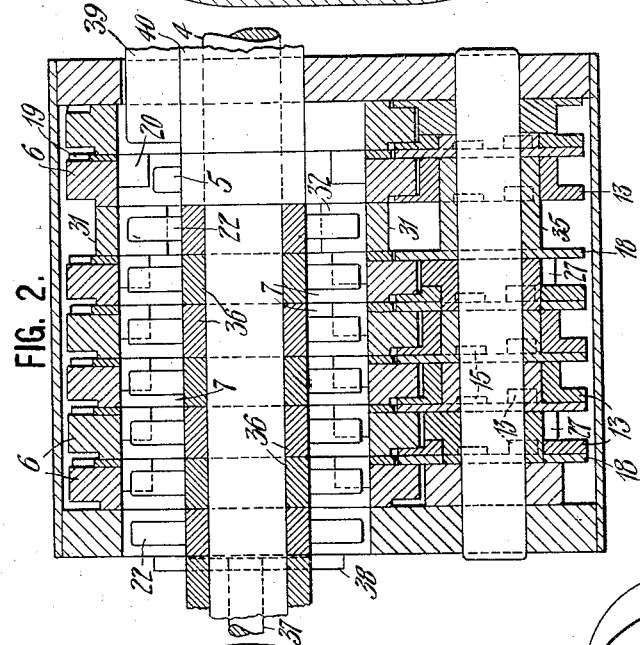
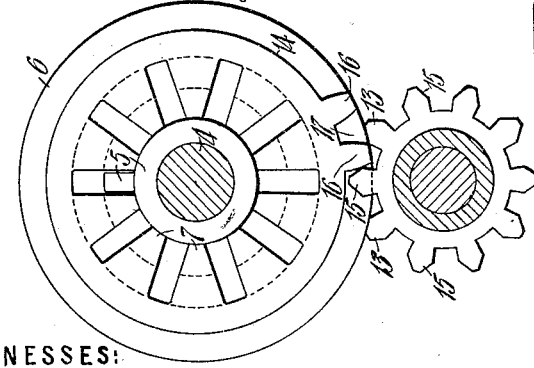
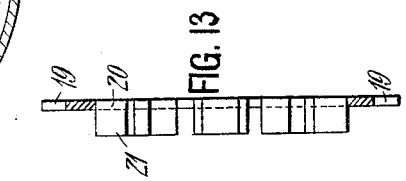
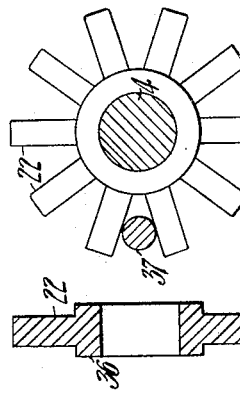
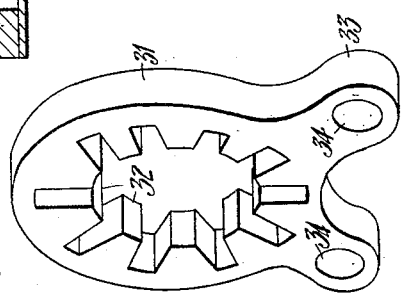
WITNESSES:
INVENTOR:
Walter Wright
BY
ATTORNEY

UNITED STATES PATENT OFFICE.

WALTER WRIGHT, OF NEW YORK, N. Y., ASSIGNOR TO UNDERWOOD COMPUTING MACHINE COMPANY, OF NEW YORK, N .Y., A CORPORATION OF NEW YORK.

COMPUTING-MACHINE.

1,216,759.

Specification of Letters Patent.

Patented Feb. 20, 1917.

Application filed July 25, 1912, Serial No. 711,396. Renewed July 7, 1916. Serial No. 108,764.

*To all whom it may concern:*

Be it known that I, WALTER WRIGHT, a citizen of the United States, residing in New York city, in the county of New York and State of New York, have invented certain new and useful Improvements in Computing-Machines, of which the following is a specification.

This invention relates to computing machines, and is illustrated in connection with a combined typewriting and computing machine of the Underwood-Wright type. In said machines, dial or computing wheels are grouped to form a totalizer, and a shaft carrying an internal master wheel is arranged to drive said computing wheels *seriatim* by means of internal gears. In the form herein illustrated, the computing head is arranged to record dollars and cents, and an empty space is left in the computing head, where a period may be written by the typewriting mechanism.

One object of the present invention is to make it impossible to attempt to compute a digit in said empty space, whereby the period would be typewritten without disturbing any computing wheel. For this purpose pointing off the space between the dimes wheel and the units of dollars wheel is preferably occupied by a partition, which is fixed to the sides of the totalizer. This partition is preferably arranged to have teeth cut in it, corresponding to the positions in which the teeth in the adjacent computing wheels will stand when said computing wheels are idle. It will result from this, that when the master wheel is engaged in such partition, it will be impossible for the master wheel to rotate, and consequently one form of mistake is prevented. While the partition does not prevent the operation of a type bar in some types of machines, yet, if a digit is written at the pointing-off place, an examination of the figures on the worksheet in the typewriter will show that a number is incorrectly written, because there will be one figure written where there should have been a period or blank space. It will, therefore, be seen that an operator can readily trace back errors.

A further object of the invention is to provide means for taking up any play in the carry-over mechanism, which is arranged to turn each computing wheel one unit when the lower adjoining computing wheel turns its zero past the sight opening. In mechanism of this general type, if no alining devices were provided, the digit wheel next above the one at the master wheel would (after a carrying operation) come to rest after turning slightly less than one digit's distance, owing to lost motion in the carrying mechanism. The wheel two denominations above the master wheel would be about twice as much out of alinement. The third wheel would be still farther away from the reading-line; and so on: in other words, the digit wheels would come to rest in a "spiral", instead of coming to rest all at the reading-line. In order to bring to the reading-line, or approximately thereto, all the digit wheels above the master wheel, certain of the computing wheels are provided with detents. In the preferred form of construction, detents are placed only at every third or fourth computing wheel. By having them at only a few of the wheels, the computing mechanism is relieved of the strain of operating a series of wheels when held by many detents, and yet the spiral train is broken, because each wheel that is provided with a detent is alined exactly, and those wheels not provided with detents are brought into closer alinement by virtue of a detent only one or two denominations away, than would be the case if the only digit wheel alined exactly were four or five denominations away. At the same time in the preferred form of mechanism, the carry-over mechanism will approximately aline the computing wheels irrespective of the detents, so that the numbers on them will properly appear in front of the sight opening. The detents take up sufficient of the lost motion to make this approximate alining practically perfect. Preferably each computing wheel is normally locked by its carry-over wheel from the computing wheel below, and is positively in mesh with said carry-over wheel, so that by having these detents take up the lost motion in the gear teeth of the various wheels, there is less danger of the gears, which engage the master wheel *seriatim*, becoming out of mesh, and, therefore, being stripped by said master wheel when said master wheel is shifted rapidly from one point of the totalizer to another.

The need for these detents is more noticeable when a series of computing wheels throw through zero and carry successively one after the other. There is apt to be a certain amount of lost motion between the Geneva lock carry-over units and the computing wheels, especially if parts are loosely fitted, so that if a series of simultaneously successive carryovers take place, say, from the units computing wheel up through the whole series, each computing wheel of higher denomination might lag slightly beyond the one next lower in denomination, which effect will be multiplied or accumulated so that the highest computing wheel in a computing head of a great number of computing wheels, might lag half a space, or even a whole space, beyond the units computing wheel. The provision, however, of an alining detent at every third computing wheel insures the justification of every third computing wheel, and the lagging of the next two succeeding computing wheels will not be of sufficient magnitude to disturb the free passage of the master wheel through the computing wheels.

Other features and advantages will hereinafter appear.

In the accompanying drawings,

Figure 1 is a front view of so much of a totalizer, and some adjacent parts as relate to my invention.

Fig. 2 is a longitudinal section through the same.

Fig. 3 is a transverse section through the same.

Fig. 4 is a diagrammatic perspective view, showing the arrangement of a computing wheel and its carry-over mechanism.

Figs. 5 and 6 are sectional and side views of a carry-over wheel, controlled by a detent.

Fig. 7 is an end view of the master wheel.

Fig. 8 is an end view of an alining bar.

Fig. 9 is a side view of a computing wheel and its carry-over wheel.

Fig. 10 is a perspective view of a partition.

Fig. 11 is a section of a coupler.

Fig. 12 is a section showing a coupler and a bar to position it.

Fig. 13 is a sectional view of a loose gear, forming part of the computing wheel.

Fig. 14 is a bottom view showing the carry-over wheels and their detents.

The invention is herein disclosed as applied to a Wright totalizer 1 mounted in frame 2 of a combined typewriting and computing machine, which is arranged to be power-driven by means of a shaft 3. Said shaft through a shaft 4 drives a master wheel 5, arranged to engage dial or computing wheels 6 seriatim. The connections between said shaft 3 and the master wheel shaft 4 include a bevel gear 7ª fast on said master wheel shaft, which constantly is in mesh with two bevel gears 8, each loose on said power shaft 3, either of which bevel gears is arranged to be locked alternatively to said power shaft by means of a shiftable clutch 9 rotating with said shaft. Said clutch comprises teeth 10 arranged to lock with teeth (not shown) in either of the bevel gears 8.

The master wheel 5 has an external tooth which is arranged to engage with internal teeth 7 on said computing wheels to turn them, of which teeth 7 in the embodiment shown, there are ten. Said computing wheels normally are arranged to stand in a line, so that said master wheel may slide through them without abutting against any of the teeth 7. When the power shaft 3 is turned, it will be seen that the master wheel will turn the computing or dial wheel with which it is engaged, and so bring a digit on the face 11 of the dial wheel to view in front of the sight opening of the totalizer 1.

For making a carry-over, i. e., turning the adjacent computing wheel one digit higher whenever the first computing wheel turns its zero past the sight opening, there are arranged a series of carry-over wheels 12, one operative on and meshing with every dial wheel, except the units wheel. Each carry-over wheel comprises broad teeth 13, which are normally arranged to ride on the surface 11 of the dial wheel next lower in denomination, (see Figs. 4 and 9), so that said carry-over wheel 12 is locked against turning in either direction by two of said teeth 13. Each dial wheel comprises a ledge 14, and in the opening formed by said ledge, thin teeth 15 on the carry-over wheel 12 are arranged to normally lie, there being one of said thin teeth 15 between every two of the broad teeth 13 on the carry-over wheel. When any computing wheel 6 brings its zero opposite the sight opening, a carrying tooth 16 extending up from said ledge 14 to the face of wheel 6 is arranged to strike the thin tooth 15 then riding in the opening formed by said ledge 14, and turn said carry-over wheel. To permit said turning said dial wheel has a recess 17 cut into it, into which the broad tooth 13 of the carry-over wheel 12 may sink. As said computing wheel completes its movement in turning its zero to the sight opening, said broad tooth 13 again rises out of the recess 17, and again rides on the surface 11 of said wheel so that said carry-over wheel is again locked, but in the meantime has been turned through sufficient space to turn the adjacent computing wheel one-tenth of a revolution.

Said adjacent computing wheel is not turned directly by said carry-over wheel, but each carry-over wheel 12 is provided with teeth 18 which constantly mesh with teeth on a loose thin gear wheel 19 forming part of said computing wheel and lying adjacent the face of the computing wheel which is to be operated by this carry-over wheel. Said thin gear carries on it internal teeth 20 corresponding in number and shape to the internal teeth 7 of the dial wheel, and each of said teeth 20 carries a projection 21, as seen best in Fig. 4, which projections are all identical, and are accommodated in corresponding notches in the internal teeth 7 of the computing wheel toward which they project. Since the teeth 20 and the notches in which they lie are all identical, the thin gear 19 may revolve independently of its computing wheel, and is guided thereon by its teeth 20 which slide in the notches in the computing wheel 6. The computing wheel 6, which is seen in Fig. 4, has one such gear 19 shown against each face of said wheel, one at the left having its flat face against the computing wheel, while at the upper portion of said figure where said wheel 6 is broken away, is seen the extension 21 of the tooth 20 of the other thin gear 19 lying in the cut-away portion of the internal tooth 7. To compel the computing wheel to be turned as a unit by its thin gear 19, there is a series of couplers (see Figs. 2, 11 and 12), which are arranged to ride idly on the master wheel shaft, and as seen in Fig. 2, each coupler comprises teeth 22, arranged to lie partly between the projections 21 of the thin gear 19 of a computing wheel, and partly between the internal teeth 7 of said computing wheel. Each coupler, therefore, will compel its computing wheel and thin gear to rotate as a unit. Therefore, since each carry-over wheel is locked against the lower computing wheel against turning in either direction, it will, by means of a coupler and thin gear, lock the upper computing wheel.

It will be noted from Fig. 2, that the master wheel 5 has its teeth so short that they cannot strike the teeth 20 of any of the thin gears 19, and it will also be seen from Fig. 4 that the computing wheels 6 each have two carrying teeth 16 on them so that the computing wheels will operate the carry-over wheels equally well backward or forward, in other words, said wheels may be used equally well for subtraction or addition. Each of the carry-over wheels 12 in addition comprises a hub 23, and on the hub of every third carry-over wheel are arranged a series of depressions 24 into which a detent 25, as best seen in Fig. 3, is normally pressed by means of a spring 26. These detents, it will be seen, positively aline their carry-over wheels by means of the flat sides 27 of the depressions on said carry-over wheels. Each of said detents comprises a roller 28 mounted on an arm 29 pivoted on a rod 30 of the totalizer, and since the carry-over wheels approximately aline the computing wheels irrespective of the said detents, it will usually be found sufficient to have said detents on every third or fourth carry-over wheel to obtain perfect alinement.

While the carry-over wheels approximately aline the computing wheels, they are somewhat loosely fitted, so that a certain amount of lost motion is in evidence. If a series carryover is made, that is, for a number of computing wheels one right after the other, this lost motion multiplies and accumulates so that it becomes quite serious for any great number of computing wheels. The provision, however, of a detent 25 at every third or fourth wheel justifies the position of such wheel, and, to a certain extent, assists in the carryover, so that every third or fourth wheel is accurately positioned. The accumulative effect then of the two or three intermediate wheels is not of sufficient magnitude to cause any trouble, so that the digits of the dial wheels will be in practical alinement, and the master wheel will be capable of passing easily from one computing wheel to another between the teeth 7. This then gives such accuracy of alinement as is necessary without burdening all of the carry-over wheels and thus the computing wheels, with the work of overcoming many spring detents, and, in fact, leaves the majority of the carry-over wheels and the computing wheels free and untrammeled during ordinary computing operations, and during a series carryover gives but one-third or one-fourth of the burden which would be in evidence if each carry-over wheel were acted upon by a spring detent.

As above stated, the totalizer herein shown is arranged to compute in dollars and cents, and there is a blank space left where a period between the dollars and cents should be written. To prevent the master wheel 5 from turning in this space as though it was computing a number, there is provided for said space a locking partition 31, as seen in Fig. 10, comprising internal teeth 32, the same in number as the internal teeth on the dial wheels 6. Said partition 31 comprises extensions 33 through holes 34 in which the rods 30 of the totalizer may pass, and thus hold said partition against movement. This partition thus in effect forms a fixed computing wheel which locks the master wheel against turning in said period space. The carry-over wheel for turning across this space may be formed like the other carry-over wheels, except as seen in Fig. 2, it comprises a long hub 35 between its teeth 18 and its teeth 13.

Of the couplers 22, sufficient are provided so that when the master wheel is at the right of the totalizer, there will be one coupler for every dial or computing wheel. Each coupler comprises a hub 36, which may turn idly on the master wheel shaft 4. When the master wheel is engaged with the units wheel, most or all of these couplers will lie inside the totalizer. As said master wheel 5 moves relatively to the dial wheel, there will be successively fewer and fewer couplers within the totalizer, and those at the left will be supported on an extension of the master wheel shaft outside of said totalizer. For holding them alined when so outside, there is provided an alining rod 37 fast on a plate 38 on the wall of the totalizer, which rod is arranged to lie between the teeth of said couplers, as seen in Fig. 12, so that as said totalizer slides over them or they slide into it, as the case may be, the teeth of the couplers will slide smoothly between the internal teeth 7 of the dial wheels. For holding the dial wheels locked against movement when they are at the right of the master wheel there is provided an alining bar comprising a fin 39 which rides between the internal teeth 7 of the computing wheels and is fast on the fixed sleeve 40 surrounding the master wheel shaft 4. This fin 39 thus locks the dial wheels against rotation in the same manner as bar 37 locks the couplers against rotation.

It will thus be seen that the computing mechanism is always held locked and positively alined, and that this is done with a minimum of springs, and that an exceedingly simple method has been provided for locking the master wheel against rotation where no computing should be done.

Variations may be resorted to within the scope of the invention, and portions of the improvements may be used without others.

Having thus described my invention, I claim:

1. In a computing machine, the combination with computing wheels, and a carry-over mechanism for holding each computing wheel locked from the computing wheel below, of detents for reducing the spiral effect of said computing wheels occasioned by lost motion in the carry-over mechanism, said detents being less than half as numerous as computing wheels.

2. In a computing machine, the combination with computing wheels, and carry-over wheels constantly in mesh therewith, of detents on certain of said carry-over wheels for breaking the spiral train in said computing wheels occasioned by lost motion in the carry-over wheels, said detents being less than half as numerous as carry-over wheels.

3. The combination with a computing wheel, of a carry-over wheel forming a Geneva lock therewith, a hub on said carry-over wheel, a depression in said hub, a spring detent working in said hub, and an adjoining carry-over wheel practically held alined by a detent on a computing wheel of lower denomination.

4. In a computing machine, the combination with computing wheels and a master wheel for turning said computing wheels *seriatim*, of a carry-over device for each computing wheel above the units wheel, means for controlling said carry-over device from the computing wheel below, and detaining means holding certain of said carry-over devices to keep their computing wheels alined; the spiral effect upon the computing wheels, occasioned by lost motion in the carry-over device, being thereby broken at a plurality of denominations of the computing wheels.

5. In a computing machine, the combination with computing wheels and a master wheel for turning said computing wheels *seriatim*, of a carry-over device for each computing wheel above the units wheel, means for controlling said carry-over device from the computing wheel below, detaining means holding certain of said carry-over devices to keep their computing wheels alined; and a partition between two of said computing wheels for preventing the master wheel from turning when between said computing wheels so that said master wheel may pass unobstructedly from said partition into either of said computing wheels on each side thereof and vice versa.

6. In a computing machine, the combination with two computing wheels and carry-over devices for controlling them, of a space equal to a computing wheel between said two computing wheels, a partition occupying said space, a master wheel adapted to turn said computing wheels *seriatim* but locked against turning by said partition, a detent holding a computing wheel alined on one side of said partition, and a computing wheel on the opposite side of said partition free of a detent but practically alined indirectly through another computing wheel by a detent.

7. In a computing machine, the combination with computing wheels and a master wheel for turning them *seriatim*, of a gear associated with each computing wheel, a carry-over wheel always in mesh with said associated gear, devices for locking each associated gear to its computing wheel, detents for directly alining certain of said carry-over wheels but not all of them, and for approximately holding alined each carry-over wheel from the computing wheel next lower in denomination.

8. A totalizer comprising computation wheels and detents placed only at every third or fourth wheel for practically alining all computing wheels, whereby the computation mechanism is relieved of the strain of operating a large series of wheels when held by many detents.

9. A totalizer comprising computation wheels and detents placed only at every third or fourth wheel, for breaking the spiral effect of the computing wheels, whereby the computation mechanism is relieved of the strain of operating a large series of wheels when held by many detents; carry-over mechanism being provided for computing wheels so as to serve as auxiliaries for the detents; means being provided for enabling each computing wheel to be normally locked by its carry-over wheel from the computing wheel of next lower denomination; said computing wheel being positively in mesh with said carry-over wheel.

10. In a computing machine, the combination with a gang of computing wheels, of carry-over devices tending to hold said computing wheels alined, and detents for part of the gang of said computing wheels but less than the whole gang for alining directly and indirectly all said computing wheels.

11. In a computing machine, the combination with computing wheels and gears thereon, of carry-over gears meshing with said computing wheel gears, and detents alining directly certain of said carry-over gears but less than the whole number.

12. In a computing machine, the combination with a series of wheels of different denominations arranged in groups of three, of one detent for each group acting to prevent excessive multiplication of lost motion in the series of wheels, said detents acting each directly on one of the wheels of a group.

13. In a computing machine, the combination with a series of wheels of different denominations grouped in sections of at least three, and a single detent serving each group of wheels by acting on one wheel of the group.

14. In a computing machine, the combination with a series of computing wheels, of a series of carry-over units for said computing wheels having a certain amount of lost motion, and alining means for taking up the lost motion solely at intervals of several wheel-spaces.

15. The combination with a series of computing wheels, of a series of carry-over wheels for said computing wheels, spring detents arranged solely at intervals of several of said carry-over wheels, said carry-over wheels coöperating with said computing wheels to enable said detents to sufficiently justify all of said computing wheels.

WALTER WRIGHT.

Witnesses:
  C. RIPLEY,
  F. E. ALEXANDER.

Copies of this patent may be obtained for five cents each, by addressing the "Commissioner of Patents, Washington, D. C."